United States Patent
Kweon et al.

(10) Patent No.: US 10,299,124 B2
(45) Date of Patent: May 21, 2019

(54) METHOD AND DEVICE FOR PROVIDING DATA SERVICE IN WIRELESS COMMUNICATION SYSTEM

(71) Applicant: Samsung Electronics Co., Ltd., Suwon-si, Gyeonggi-do (KR)

(72) Inventors: Ki-Suk Kweon, Suwon-si (KR); Ji-Cheol Lee, Suwon-si (KR); Hyung-Ho Lee, Seoul (KR); Ha-Kyung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/570,077

(22) PCT Filed: Apr. 28, 2016

(86) PCT No.: PCT/KR2016/004458
§ 371 (c)(1),
(2) Date: Oct. 27, 2017

(87) PCT Pub. No.: WO2016/175578
PCT Pub. Date: Nov. 3, 2016

(65) Prior Publication Data
US 2018/0109945 A1    Apr. 19, 2018

(30) Foreign Application Priority Data

Apr. 28, 2015   (KR) .................. 10-2015-0059973

(51) Int. Cl.
*H04W 4/00*    (2018.01)
*H04W 12/06*    (2009.01)
(Continued)

(52) U.S. Cl.
CPC ............ *H04W 12/06* (2013.01); *G06F 21/41* (2013.01); *H04L 12/14* (2013.01);
(Continued)

(58) Field of Classification Search
CPC ..... H04W 12/12; H04W 12/06; H04W 12/08; H04W 12/02; H04W 88/02; H04W 88/06;
(Continued)

(56) References Cited

U.S. PATENT DOCUMENTS 7,885,654 B2    2/2011   Fadell
8,825,876 B2    9/2014   Krishnaswamy et al.
(Continued)

FOREIGN PATENT DOCUMENTS

KR    10-2013-0142508 A    12/2013
WO    2013/085314 A1    6/2013

*Primary Examiner* — Temica M Beamer
(74) *Attorney, Agent, or Firm* — Jefferson IP Law, LLP

(57) ABSTRACT

Disclosed is a 5G or pre-5G communication system for supporting a data transmission rate higher than that of a 4G communication system such as LTE. Disclosed is a method for providing a data service in a global virtual network provider of a wireless communication system, comprising the steps of: determining a wireless network for providing a data service on the basis of at least one of a service type, service quality, and price information required by a user; and transmitting, to a terminal, wireless network information including the determined wireless network, wherein the terminal and the determined wireless network are temporarily connected before the wireless network is determined.

20 Claims, 7 Drawing Sheets

(51) Int. Cl.

| | |
|---|---|
| *H04W 48/08* | (2009.01) |
| *G06F 21/41* | (2013.01) |
| *H04W 8/18* | (2009.01) |
| *H04W 12/04* | (2009.01) |
| *H04W 48/18* | (2009.01) |
| *H04W 4/24* | (2018.01) |
| *H04W 4/60* | (2018.01) |
| *H04L 12/14* | (2006.01) |
| *H04M 15/00* | (2006.01) |
| *H04W 12/08* | (2009.01) |

(52) U.S. Cl.
CPC ... *H04M 15/8083* (2013.01); *H04M 15/8214* (2013.01); *H04W 4/24* (2013.01); *H04W 4/60* (2018.02); *H04W 8/18* (2013.01); *H04W 12/04* (2013.01); *H04W 48/08* (2013.01); *H04W 48/18* (2013.01); *H04W 12/08* (2013.01)

(58) Field of Classification Search
CPC ..... H04W 48/16; H04W 48/18; H04W 48/20; H04W 48/12; H04W 60/00; H04W 60/04; H04W 8/26; H04W 8/04; H04W 36/14
USPC ........... 455/410, 411, 434, 435.1, 435.2, 436
See application file for complete search history.

(56) References Cited

U.S. PATENT DOCUMENTS

| | | |
|---|---|---|
| 2010/0017861 A1 | 1/2010 | Krishnaswamy et al. |
| 2011/0130140 A1 | 6/2011 | Fadell |
| 2012/0166622 A1 | 6/2012 | Draznin et al. |
| 2014/0086177 A1 | 3/2014 | Adjakple et al. |
| 2014/0094138 A1 | 4/2014 | Saker et al. |
| 2014/0120867 A1 | 5/2014 | Hodges |
| 2014/0348029 A1 | 11/2014 | Lee et al. |
| 2016/0012465 A1* | 1/2016 | Sharp .................... G06Q 20/18 705/14.17 |
| 2017/0257886 A1* | 9/2017 | Adjakple ............. H04W 12/08 |

* cited by examiner

METHOD AND DEVICE FOR PROVIDING DATA SERVICE IN WIRELESS COMMUNICATION SYSTEM

CROSS-REFERENCE TO RELATED APPLICATION(S)

The present application claims priority under 35 U.S.C. § 365 to International Patent Application No. PCT/KR2016/004458 filed on Apr. 28, 2016, entitled "METHOD AND DEVICE FOR PROVIDING DATA SERVICE IN WIRELESS COMMUNICATION SYSTEM" and, to Korean Patent Application No. 10-2015-0059973 filed on Apr. 28, 2015 which is incorporated herein by reference into the present disclosure as if fully set forth herein.

TECHNICAL FIELD

The present disclosure relates to a method and a device for providing a data service in a wireless communication system.

BACKGROUND ART

In order to meet the demand for wireless data traffic which has increased since the commercialization of the fourth Generation (4G) communication system, efforts have been made to develop an improved fifth Generation (5G) communication system or a pre-5G communication system. For this reason, the 5G or pre-5G communication system is called a "beyond 4G network communication system" or a "post Long-Term Evolution (LTE) communication system."

In order to achieve a high data transfer rate, the 5G communication system is considered to be implemented in an ultra-high frequency (millimeter Wave (mmWave)) band (e.g., 60 GHz band). In order to reduce the path loss of radio waves and increase the transmission distance thereof in the mmWave band, techniques, such as beamforming, massive Multiple-Input Multiple-Output (MIMO), Full-Dimensional MIMO (FD-MIMO), array antenna, analog beamforming, and large scale antenna, are under discussion in the 5G communication system.

Also, in order to improve a network of a system, the development of techniques, such as evolved small cell, advanced small cell, cloud Radio Access Network (cloud RAN), ultra-dense network, Device-to-Device (D2D) communication, wireless backhaul, moving network, cooperative communication, Coordinated Multi-Points (CoMP), and reception interference cancellation, has been conducted in the 5G communication system.

In addition, hybrid Frequency Shift Keying (FSK) and Quadrature Amplitude Modulation (QAM) modulation (FQAM) and Sliding Window Superposition Coding (SWSC), which are Advanced Coding Modulation (ACM) schemes; and Filter Bank Multi-Carrier (FBMC), Non-Orthogonal Multiple Access (NOMA), and Sparse Code Multiple Access (SCMA), which are advanced access techniques, have been developed in the 5G system.

Meanwhile, an LTE standard which is fourth generation mobile communication according to a third Generation Partnership Project (3GPP) standard supports sponsored data connectivity which allows a service provider to pay the mobile communication usage fee of a user equipment using a service on behalf of the user equipment.

However, sponsored data connectivity rules are based on the assumption that a user is already subscribed to a mobile communication operator, and has a limitation in that it fails to provide a method capable of sponsoring a mobile communication usage fee for a user equipment that is not subscribed to a mobile communication operator. When consideration is given to the trend of increasing demand for portable devices requiring sponsor-type internet connectivity, including a portable electronic book terminal, conventional sponsored data connectivity rules which require a subscription to a mobile communication operator reduce the convenience of the user. That is, a conventional scheme for sponsored data connectivity is problematic in that it allows an operator to provide a service for sponsored data connectivity only to subscribers of the operator and when a user uses a sponsored data connectivity service, the user is limited to using only a network to which the user is subscribed.

DISCLOSURE

Technical Problem

The present disclosure provides a method and a device for allowing a user to receive a sponsored data connectivity service not only through a network to which the user is subscribed, but also through a network of another operator.

The present disclosure provides a method and a device for improving the convenience of a user and allowing a network operator to increase sales.

The present disclosure provides a method and a device for allowing a user to reduce a communication charge.

The present disclosure provides a method and a device for providing a particular data service to a user or a user equipment that is not subscribed to a mobile communication operator.

Technical Solution

In accordance with an aspect of the present disclosure, a method for providing a data service by a global virtual network operator of a wireless communication system is provided. The method includes: determining a wireless network providing a data service on the basis of at least one of a service type, service quality, and price information which are required by a user; and transmitting, to a user equipment, wireless network information including the determined wireless network, wherein the user equipment performs a semi-attach to the determined wireless network before the wireless network is determined.

In accordance with another aspect of the present disclosure, a device for providing a data service in a global virtual network operator of a wireless communication system is provided. The device includes: a controller configured to determine a wireless network providing a data service on the basis of at least one of a service type, service quality, and price information, which are required by a user, and transmit, to a user equipment, wireless network information including the determined wireless network, wherein the user equipment performs a semi-attach to the determined wireless network before the wireless network is determined.

In accordance with still another aspect of the present disclosure, a method for receiving a data service by a user equipment of a wireless communication system is provided. The method includes: receiving, from a global virtual network operator, wireless network information including a wireless network, the wireless network is determined as a wireless network providing a data service on the basis of at least one of a service type, service quality, and price information which are required by a user; and performing a semi-attach to the wireless network before the wireless network information is received.

In accordance with yet another aspect of the present disclosure, a device for receiving a data service in a user equipment of a wireless communication system is provided. The device includes: a controller configured to receive, from a global virtual network operator, wireless network information including a wireless network, the wireless network is determined as a wireless network providing a data service on the basis of at least one of a service type, service quality, and price information which are required by a user, and perform a semi-attach to the wireless network before the wireless network information is received.

Advantageous Effects

The present disclosure allows a user to receive a sponsored data connectivity service not only through a network to which the user is subscribed, but also through a network of another operator.

The present disclosure can improve the convenience of a user and allows a network operator to increase sales.

The present disclosure allows a user to reduce a communication charge.

MODE FOR INVENTION

Figure 1:
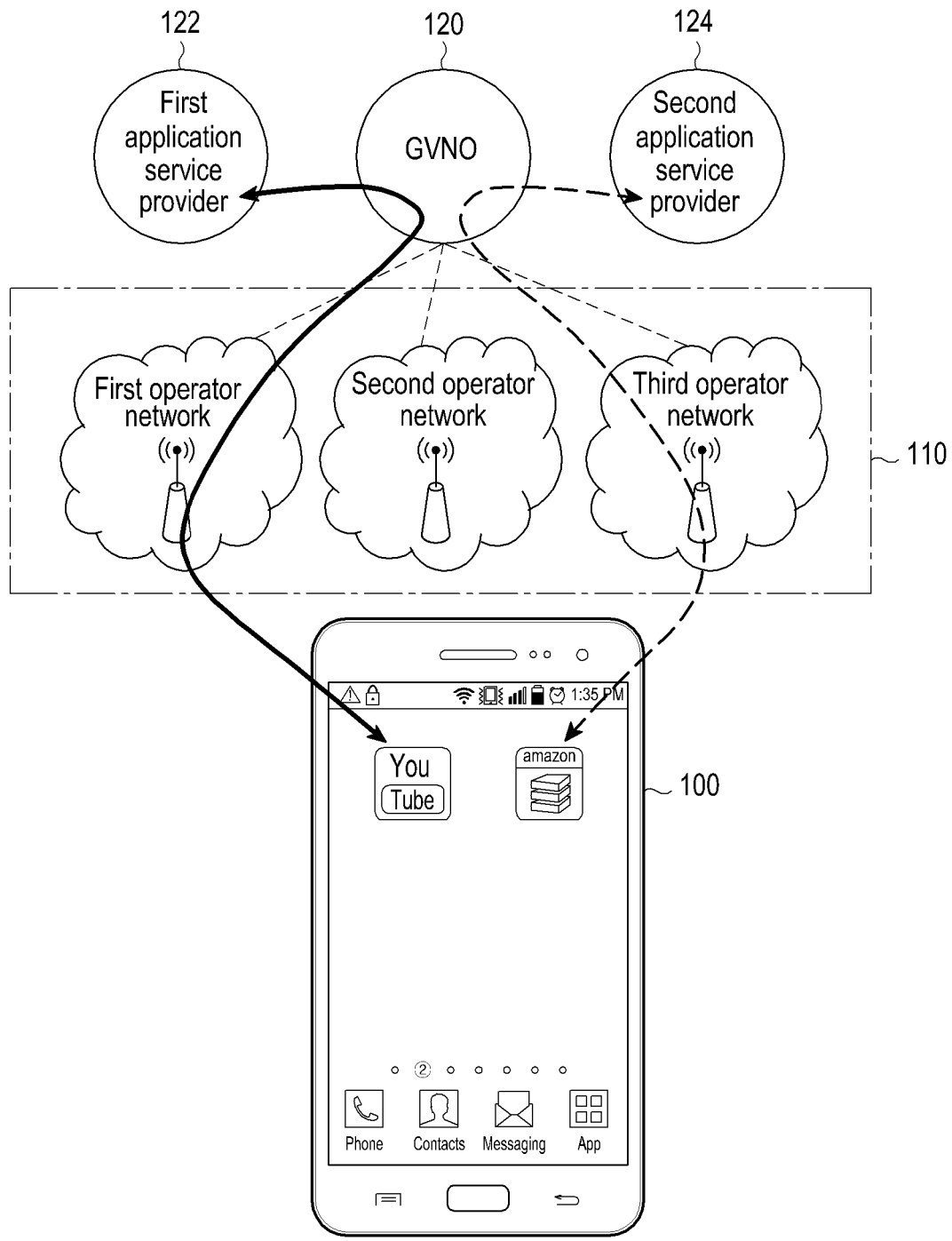
FIG. 1 is a view illustrating a structure of a network according to an embodiment of the present disclosure.

Hereinafter, exemplary embodiments of the present disclosure will be described in detail with reference to the accompanying drawings. In this case, it should be noted that the same reference numerals will designate the same elements where possible in the accompanying drawings. Also, a detailed description of known functions and configurations incorporated herein which may obscure the subject matter of the present disclosure will be omitted.

Also, in the following description, the terms or words used in the present specification and claims should not be interpreted as being limited to typical or dictionary meanings, but should be interpreted as having meanings and concepts satisfying the technical idea of the present disclosure, based on the principle that an inventor can appropriately define the concept of terms in order to describe his/her own invention in the best manner.

The terms used herein are only used to describe particular embodiments of the present disclosure, and are not intended to limit the present disclosure. As used herein, the singular forms are intended to include the plural forms as well, unless the context clearly indicates otherwise. In the present specification, it should be understood that the terms "comprising," "including" or "having" are intended to indicate the existence of the features, numbers, steps, operations, elements, parts, or combinations thereof disclosed in the specification, and are not intended to preclude the possibility that one or more other features, numbers, steps, operations, elements, parts, or combinations thereof may exist or may be added.

Unless otherwise defined, all terms (including technical and scientific terms) used herein have the same meanings as those commonly understood by those having ordinary knowledge in the technical field to which the present disclosure pertains. Terms, such as those defined in commonly used dictionaries, should be interpreted as having meanings consistent with their meanings in the context of the relevant art, and will not be interpreted in an idealized or overly formal sense unless expressly so defined herein.

It goes without saying that embodiments of the present disclosure can be applied to various communication systems, including an LTE wireless communication system, a Long Term Evolution-Advanced (LTE-A) (hereinafter referred to as "LTE-A") wireless communication system, a High-Speed Downlink Packet Access (HSDPA) (hereinafter referred to as "HSDPA") wireless communication system, a High-Speed Uplink Packet Access (HSUPA) (hereinafter referred to as "HSUPA") wireless communication system, a High-Rate Packet Data (HRPD) (hereinafter referred to as "HRPD") wireless communication system satisfying the Third Generation Project Partnership 2 (3GPP2) (hereinafter referred to as "3GPP2"), a Wideband Code Division Multiple Access (WCDMA) (hereinafter referred to as "WCDMA") wireless communication system satisfying the 3GPP2, a Code Division Multiple Access (CDMA) (hereinafter referred to as "CDMA") wireless communication system satisfying the 3GPP2, an Institute of Electrical and Electronics Engineers (IEEE) (hereinafter referred to as "IEEE") 802.16m communication system, an Evolved Packet System (EPS) (hereinafter referred to as "EPS"), a Mobile Internet Protocol (Mobile IP) (hereinafter referred to as "Mobile IP") system, and the like.

In an embodiment of the present disclosure, a user equipment may be a Personal Digital Assistant (PDA) having a communication function, a smart phone, a mobile phone, a tablet computer, a notebook computer, and the like.

In an embodiment of the present disclosure, a user equipment may include a Machine-to-Machine (M2M) terminal and a Machine-Type Communication (MTC) terminal/device, but is not limited thereto.

The present disclosure broadly includes a process for searching, by a user equipment, for an operator network in order to achieve sponsored data connectivity, a process for attaching to another network in order to receive a sponsored data connectivity service, a semi-attach process for attaching to another high-speed network, a network information reception process for receiving a network state, and the like.

In sponsored data connectivity rules, a sponsor signs a business contract with a mobile communication operator, and pays a mobile communication charge for a service of a particular Application Service Provider (ASP) used by a subscriber on behalf of the subscriber. At this time, the sponsor and the ASP may be different operators, or may be the same operator. The sponsor or the ASP may exchange a Policy and Charging Rules Function (PCRF) of an operator network, policy and charging information thereof, and the like through an Application Function (AF) of a 3GPP standard.

FIG. 1 is a view illustrating a structure of a network according to an embodiment of the present disclosure.

A user equipment 100 refers to a user equipment attaching to a packet data network such as the Internet. The user equipment according to an embodiment of the present disclosure includes an embedded Universal Integrated Circuit Card (eUICC). An eUICC will be described in detail below.

A Global Virtual Network Operator (GVNO) 120 refers to a virtual network operator that contracts with a global Mobile Network Operator (MNO) and provides a data service, that is, a wired/wireless communication service to a user who uses a service of a Global Service Provider (GSP).

GSPs 122 and 124 refer to global operators (e.g., Google, Amazon, Facebook, Netflix, etc.) that provide the sale of digital content (e.g., videos, eBooks, games, etc.), social network services, and the sale of products through a communication network.

In the present disclosure, ASPs (i.e., the first and second ASPs 122 and 124) sign a contract for provision of sponsored data connectivity with the GVNO 120 in order to provide a user with a sponsored data connectivity service. Also, the GVNO 120 signs a contract for a virtual network with multiple operator networks (i.e., first, second, and third operator networks) 110 in order to provide a wireless data transmission service.

That is, the GVNO 120 serves as an intermediary between the multiple operator networks 110 and the ASPs 122 and 124 in order to support sponsored data connectivity of a user equipment that is subscribed to the multiple operator networks 110. The first, second, and third operator networks refer to networks possessed by operators, for example, SKT and KT.

The GVNO 120 may provide mobile communication services of the ASPs 122 and 124 to the user equipment, which is subscribed to the multiple operator networks 110, through the multiple operator networks 110, and may pay a communication charge, which is incurred by the provision of the services, on behalf of the user equipment, or may charge the communication charge to a sponsor.

As another embodiment of the present disclosure, the ASPs 122 and 124 may directly attach to an MNO without passing through the separate GVNO 120, and thereby may support a user equipment, which is subscribed to the MNO, so as to use services of the ASPs 122 and 124 through the MNO. In this case, each of the ASPs 122 and 124 may be defined to include a function of the GVNO 120. In the following description, for convenience of description, the GVNO 120 will be described separately from the ASPs 122 and 124, but it will be obvious that the following description can be applied to even a case where each of the ASPs 122 and 124 includes the function of the GVNO 120.

In an embodiment of the present disclosure, a user is assumed to be subscribed to the first operator network. A user equipment is assumed to be currently located in service coverage areas of the second and third operator networks as well as that of the first operator network. Also, a video streaming service operator and a content (e.g., a book) sales operator are assumed to have contracted with the GVNO 120 and to be providing a user with a sponsored data connectivity service. Further, the GVNO 120 is assumed to have signed a contract for a virtual network with each of the first, second, and third operator networks.

A user equipment attempts to receive a High-Definition (HD) video streaming service through sponsored data connectivity. When a user of the user equipment desires to view the HD video streaming service without buffering, the transmission quality of a network is important. The GVNO 120 selects, for example, the second operator network which has the best network state and satisfies the Quality of Experience (QoE) of the user, and provides the service to the user equipment. Although the user is a subscriber subscribed to the first operator network, the transmission quality of a network is important for a video streaming service, and thus, the user may receive the video streaming service through the second operator network having the best network state.

In contrast, when the user equipment downloads content (e.g., a game, a book, etc.), the transmission quality of a network is not important. At this time, the GVNO 120 may select the third operator network having a low transmission cost and may provide the service, and thereby can reduce the transmission cost of an ASP. The GVNO 120 may select an operator network on the basis of a service type, and thereby may receive a service from an ASP at low cost. Also, in an embodiment of the present disclosure, although the GVNO 120 may select an operator network on the basis of a service type, it goes without saying that the user equipment may select an operator network on the basis of a service type.

Figure 2:
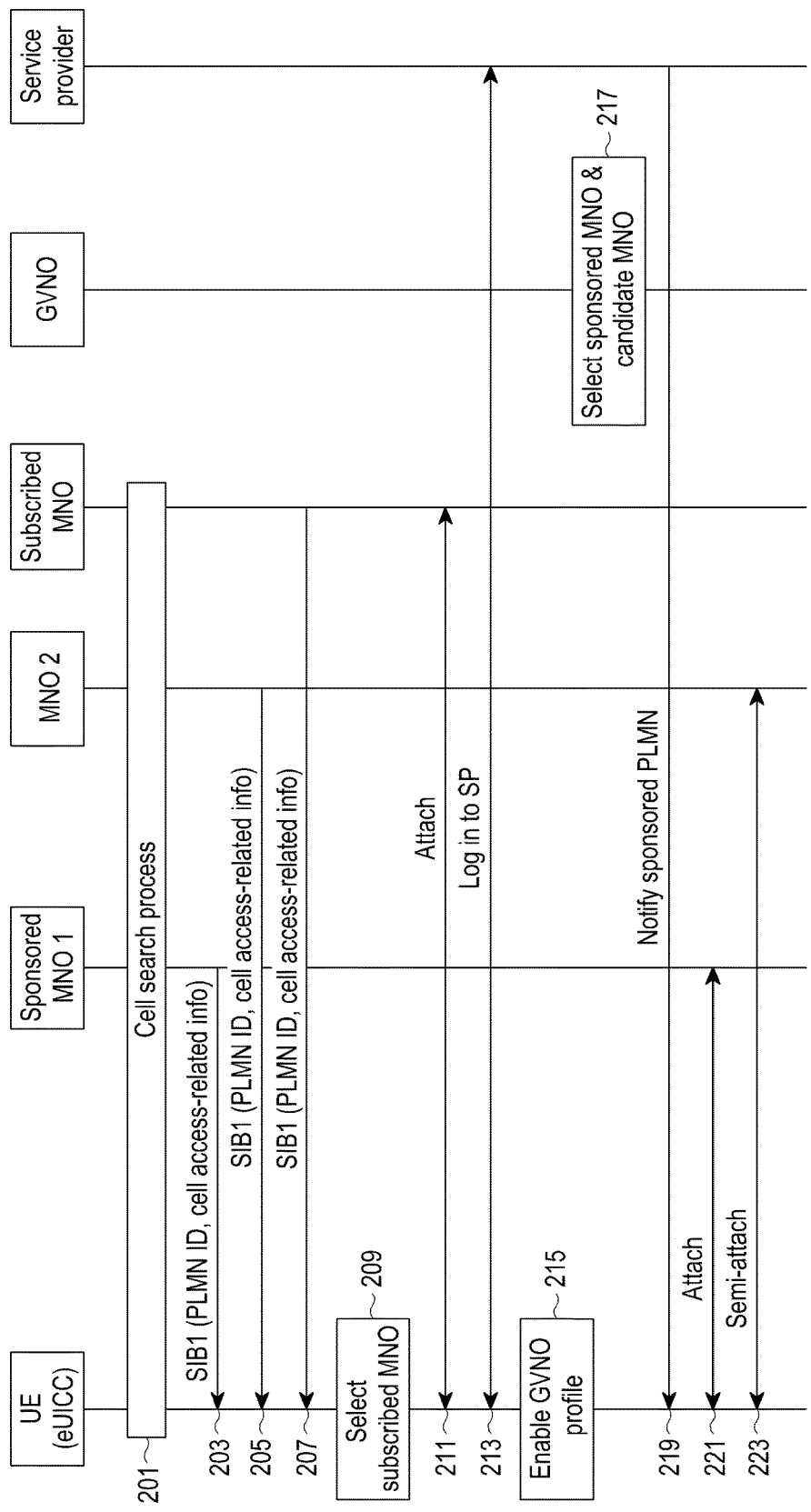
FIG. 2 is a flow diagram illustrating a process for searching for an operator network according to an embodiment of the present disclosure.

FIG. 2 is a flow diagram illustrating a process for searching for an operator network according to an embodiment of the present disclosure.

A user equipment has a subscriber interface module such as a Universal Integrated Circuit Card (UICC).

When the user equipment is powered on, in step 201, the user equipment performs a cell search process by using frequency information stored in an eUICC profile in order to attach to an operator network (MNO). The user equipment searches not only for a frequency of a network to which the user equipment itself is subscribed, but also for frequencies of all subscriber networks that provide sponsored data connectivity services, that is, that have entered into a contractual relationship with the GVNO 120.

In steps 203, 205, and 207, the user equipment distinguishes one network operator from another by using a Public Land Mobile Network ID (PLMN ID) included in a System Information Block 1 (SIB1) message received from each of MNOs (sponsored MNO 1, MNO2, and subscribed MNO), and stores/records cell access-related information. That is, the cell access-related information includes information on the subscribed network, MNO information of the MNOs that are in a contractual relationship with the GVNO, and the like. In step 209, the user equipment selects the subscribed MNO on the basis of the information included in the SIB1 message. Accordingly, in step 211, the user equipment attaches to the subscribed network (MNO) for an always-connected service.

In an embodiment of the present disclosure, a user equipment is assumed to use an eUICC. The eUICC may be fixed and mounted to the user equipment, or may be attached/detached to/from the user equipment as in the case of an existing Universal Integrated Circuit Card (UICC) (hereinafter referred to as an "eUICC"). However, it should be noted that the eUICC has a concept including an element functionally identical to the existing eUICC.

In an embodiment of the present disclosure, a UICC, which is a smart card used in a state of being inserted into a mobile communication terminal, may refer to a chip that stores personal information such as network attach authentication information, a telephone directory, and a Short Message Service (SMS) (hereinafter referred to as an "SMS") of a mobile communication subscriber, authenticates a subscriber and generates a traffic security key, and thereby allows the secure use of mobile communication, when the mobile communication terminal attaches to a mobile communication network, such as a Global System for Mobile communications (GSM) (hereinafter referred to as "GSM"), a Wideband Code Division Multiple Access (WCDMA) (hereinafter referred to as "WCDMA") mobile communication system, or a Long-Term Evolution (LTE) (hereinafter referred to as "LTE") mobile communication system.

Communication applications, including a Subscriber Identification Module (SIM) (hereinafter referred to as a "SIM"), a Universal SIM (USIM) (hereinafter referred to as a "USIM"), an Internet Protocol (IP) multimedia SIM (ISIM) (hereinafter referred to as an "ISIM"), and the like, may be loaded into the UICC according to the type of mobile communication network to which a subscriber attaches. Also, the UICC may provide a high-level security function for loading various application programs, including an electronic wallet, ticketing, an electronic passport, and the like.

Also, in an embodiment of the present disclosure, it is assumed that two or more profiles (identical to USIMs) within the eUICC may be simultaneously enabled. As an example, a profile may include a subscriber identifier (e.g., International Mobile Subscriber Identity (IMSI), hereinafter referred to as an "IMSI") of the user equipment and an encryption key (e.g., K) for authentication, and may also include various pieces of information for a communication service provided by a relevant communication operator. Further, an embodiment of the present disclosure may be applied to even an operation of an eUICC having a form manufactured as a UICC. The eUICC may download and install a profile through a typical IP network such as a wireless communication network, Wi-Fi, or the like. When the user equipment is subscribed to an ASP, in order to receive a sponsored data connectivity service, the user equipment receives one profile from the GVNO. That is, the user equipment has a profile received from the subscriber network and the profile received from the GVNO. Basically, the profile issued by the MNO to which the user equipment is subscribed is always enabled for an always-connected service.

A network other than the subscribed network among the pieces of MNO information received through the cell search process merely maintains network information and does not perform an attach procedure. In step 213, not until the user equipment logs in to an ASP server in order to use a sponsored data connectivity service does the user equipment attach to another MNO (e.g., the ASP).

Also, when the user equipment logs in to the ASP server, the user equipment transmits, together, the MNO information received through the cell search process and location information of the user equipment.

Then, in step 215, the user equipment enables the profile received from the GVNO. At the same time, in step 217, the GVNO selects an MNO, which is most appropriate for the user equipment, and a candidate network (candidate MNO) on the basis of the information (e.g., at least one of a service type, Quality of Service (QoS), and costs) transmitted by the user equipment, and in step 218, notifies the ASP of a result of the selection. Then, in step 219, the ASP transmits, to the user equipment, a sponsored PLMN notification message including a serving PLMN identifier, a candidate PLMN identifier, wireless configuration information, and the like. Through a PLMN notification message, the ASP notifies the user equipment that the sponsored MNO selected by the GVNO is, for example, the MNO 1 and a candidate MNO selected by the GVNO is, for example, the MNO 2. In step 221, for a sponsored data connectivity service, the user equipment attaches to the MNO (e.g., the MNO 1) selected by the GVNO. Also, in step 223, the user equipment performs a semi-attach to the candidate MNO selected by the GVNO. The semi-attach according to an embodiment of the present disclosure is a method for allowing rapid and easy inter-network mobility when the state of the network that currently provides a sponsored service is changed and the user equipment needs to move to another network.

Figure 3:
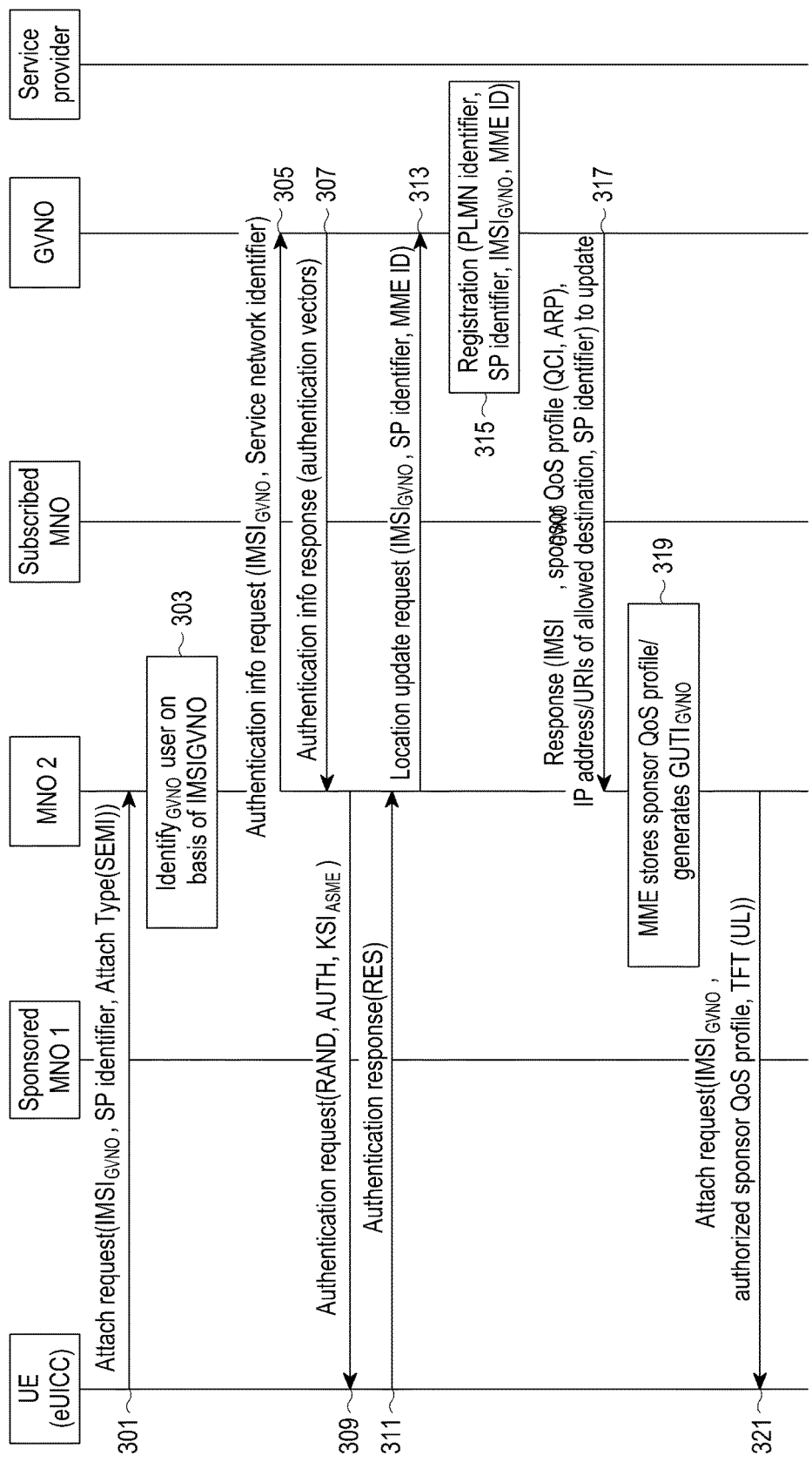
FIG. 3 is a flow diagram illustrating a process for performing a semi-attach to a candidate operator network by a user equipment according to an embodiment of the present disclosure.

FIG. 3 is a flow diagram illustrating a process for performing a semi-attach to a candidate operator network by a user equipment according to an embodiment of the present disclosure.

The user equipment performs a semi-attach to the candidate MNO delivered by the GVNO so as to rapidly and easily change a network to another MNO. Through the semi-attach, the user equipment is authenticated by the network, and configures security keys required for communication.

In step 301, the user equipment transmits, to a network (MNO 2), an attach request message including an $IMSI_{GVNO}$, an SP identifier, and an attach type (SEMI). Here, IMSI represents a subscriber identifier of a GVNO, and the SP identifier represents an identifier of a service provider. Here, the attach type represents whether an attach is a semi-attach. That is, a SEMI type, which is a new attach type, is defined to notify the network that the attach is a semi-attach. In step 301, in order to authenticate the user equipment, an $IMSI_{GVNO}$ included in the profile issued by the GVNO is used as a user ID. Lastly, in step 301, the SP identifier which is an ID of the ASP to which the user has logged in is also included in the attach request message and the attach request message including the SP identifier is transmitted.

In step 303, a network (MNO 2) of an MNO that has received the attach request message may detect the value of the $IMSI_{GVNO}$, and may check that the user is not a user subscribed to the MNO 2 but a user of a virtual network (GVNO). The IMSI value may include a PLMN ID of an operator. In step 305, in order to authenticate the user, the MNO 2 transmits, to the GVNO, an authentication information request message including a user IMSI value and a service network identifier, and in step 307, receives, from the GVNO, an authentication information response message including authentication vectors. The MNO 2 configures a key value for performing mutual authentication and communication between the MNO 2 and the user equipment through the authentication procedure.

In step 309, the MNO 2 transmits, to the user equipment, an authentication request message including authentication vectors such as RAND (random number value), AUTH, and $KSI_{ASME}$, and in step 311, receives an authentication response message from the user equipment. Here, RAND and AUTH, which are included in the authentication request message, represent a random number value and an authentication value, respectively. $KSI_{ASME}$ (Key set identifier$_{Access\ Security\ Management\ Entity}$) represents an authentication key. The MNO 2 authenticates the user equipment by receiving the authentication response message. The authentication vectors are not limited to RAND (random number value), AUTH, and $KSI_{ASME}$.

In step 313, in order to register the location of the user, the MNO 2 transmits, to the GVNO, a location update request message including an SP identifier, a user IMSI value ($IMSI_{GVNO}$), and a Mobility Management Entity ID (MME ID) used to register the user equipment. In step 315, the GVNO stores the received information (PLMN identifier, SP identifier, $IMSI_{GVNO}$, and MME ID) in a Home Subscriber Server (HSS) thereof Here, the HSS manages authentication information and service information on a user and a user equipment. More specifically, the HSS, which is a subscriber database accommodating information (profiles) of subscribers subscribed to a mobile communication network, manages a user identifier, service rights, an authentication state, filter criteria, and the like, and provides subscriber information by interfacing with another system, or receives subscriber information by interfacing therewith and stores the received subscriber information.

In step 317, the HSS of the GVNO transmits, to an MME (MNO 2), sponsor QoS profile information which needs to be transmitted to the user equipment by using the SP ID transmitted by the GVNO, $IMSI_{GVNO}$, an IP address of a site which needs to provide a sponsored data connectivity service, an SP ID, and Uniform Resource Identifier (URI) information. Here, the QoS profile information includes a QoS Class Identifier (QCI), Allocation and Retention Priority (ARP), APN-AMBR (uplink/downlink (UL/DL)), and the like. In step 319, the MME (MNO 2) manages the mobility, location, and registration of the user equipment. In step 319, the MME (MNO 2) stores the received sponsor QoS profile information, assigns a Globally Unique Temporary Identifier (GUTI) which is a temporal ID that the user equipment needs to use in a network, and in step 321, notifies the user equipment of the GUTI through an attach accept message. Here, the attach accept message includes $IMSI_{GVNO}$, an authorized sponsor QoS profile, a Traffic Flow Template (TFT) (UL), and the like.

Figure 4:
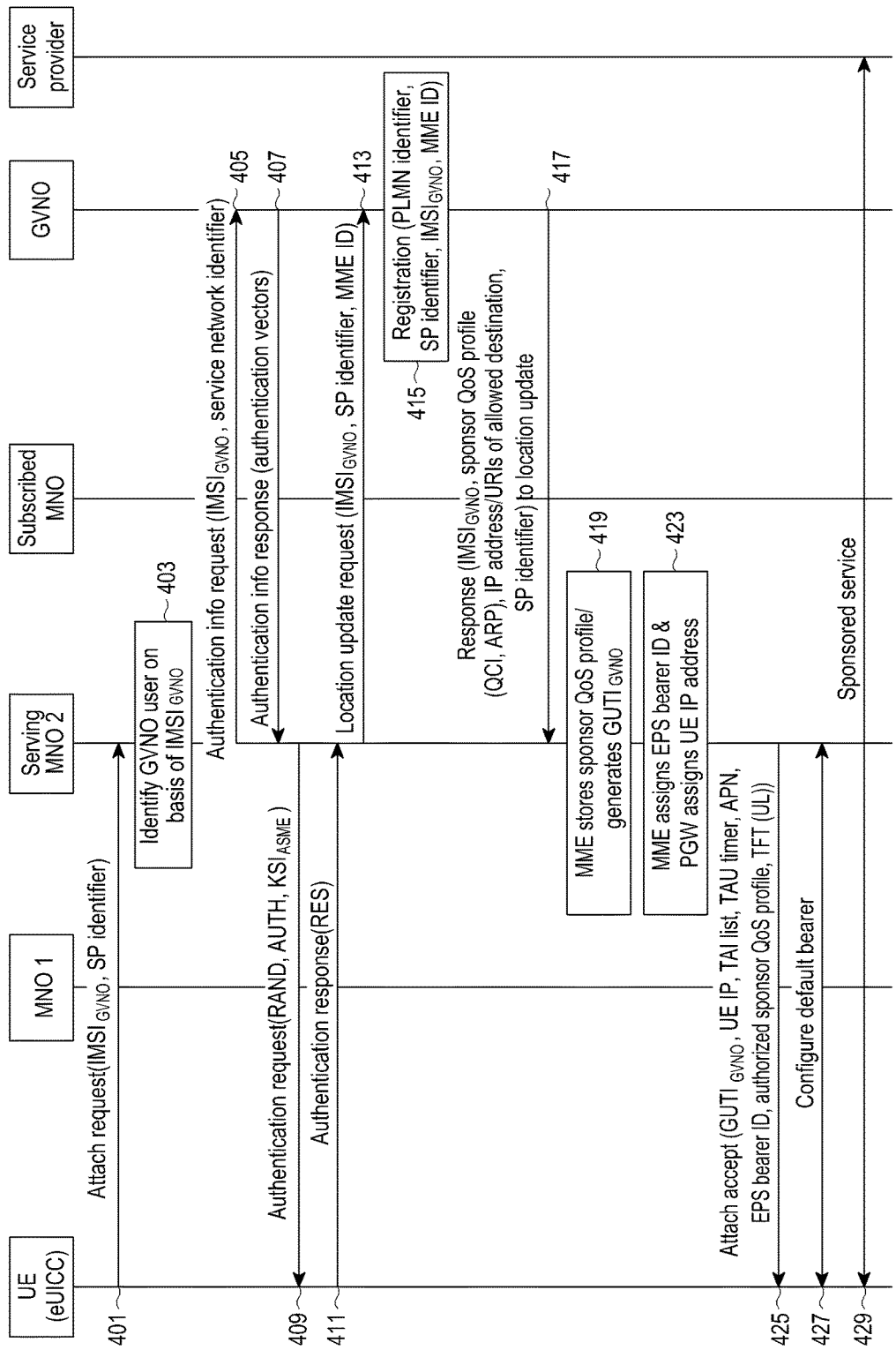
FIG. 4 is a flow diagram illustrating a process for attaching to, by a user, a network selected by a virtual network operator in order to achieve sponsored data connectivity according to an embodiment of the present disclosure.

FIG. 4 is a flow diagram illustrating a process for attaching to, by a user, a network selected by a virtual network operator in order to achieve sponsored data connectivity according to an embodiment of the present disclosure.

In step 401, in order to attach to an MNO, a user equipment transmits an attach request message to an MME (serving MNO 2). The attach request message may include $IMSI_{GVNO}$ and an ID (i.e., an SP identifier) of an ASP. In FIG. 4, an attach is not a semi-attach, and thus, an attach type is not different from an attach type used for an existing attach request.

Steps 401 to 419 of FIG. 4 are similar to steps 301 to 319 of FIG. 3, and thus, a description thereof will be omitted.

In a semi-attach procedure, a user equipment does not immediately perform data communication through a network to which the user equipment is attaching, and thus, a procedure for configuring a default bearer is not required. A semi-attach includes configuration of a key required for mutual authentication and data communication between the user equipment and the network, registration of the location of the user equipment in a virtual network, and the like. In contrast, in a normal attach procedure, the user equipment needs to transmit/receive sponsored data through a network to which the user equipment is attaching, and thus, it is necessary to configure a default bearer. To this end, in step 423, the MME assigns an EPS bearer ID, and a Packet Data Network Gateway (PGW) assigns an IP address that the user equipment is to use. In step 425, the MME notifies the user equipment of an attach accept message including information ($GUTI_{GVNO}$, UE IP, Tracking Area Identity (TAI) list, Tracking Area Update (TAU) timer, APN, EPS bearer ID, allowed sponsor QoS profile, TFT (UL), etc.) required for communication.

In step 427, the user equipment configures an MME and a default bearer on the basis of the received information. Then, in step 429, the user equipment performs a sponsored data connectivity service through the configured default bearer.

Figure 5:
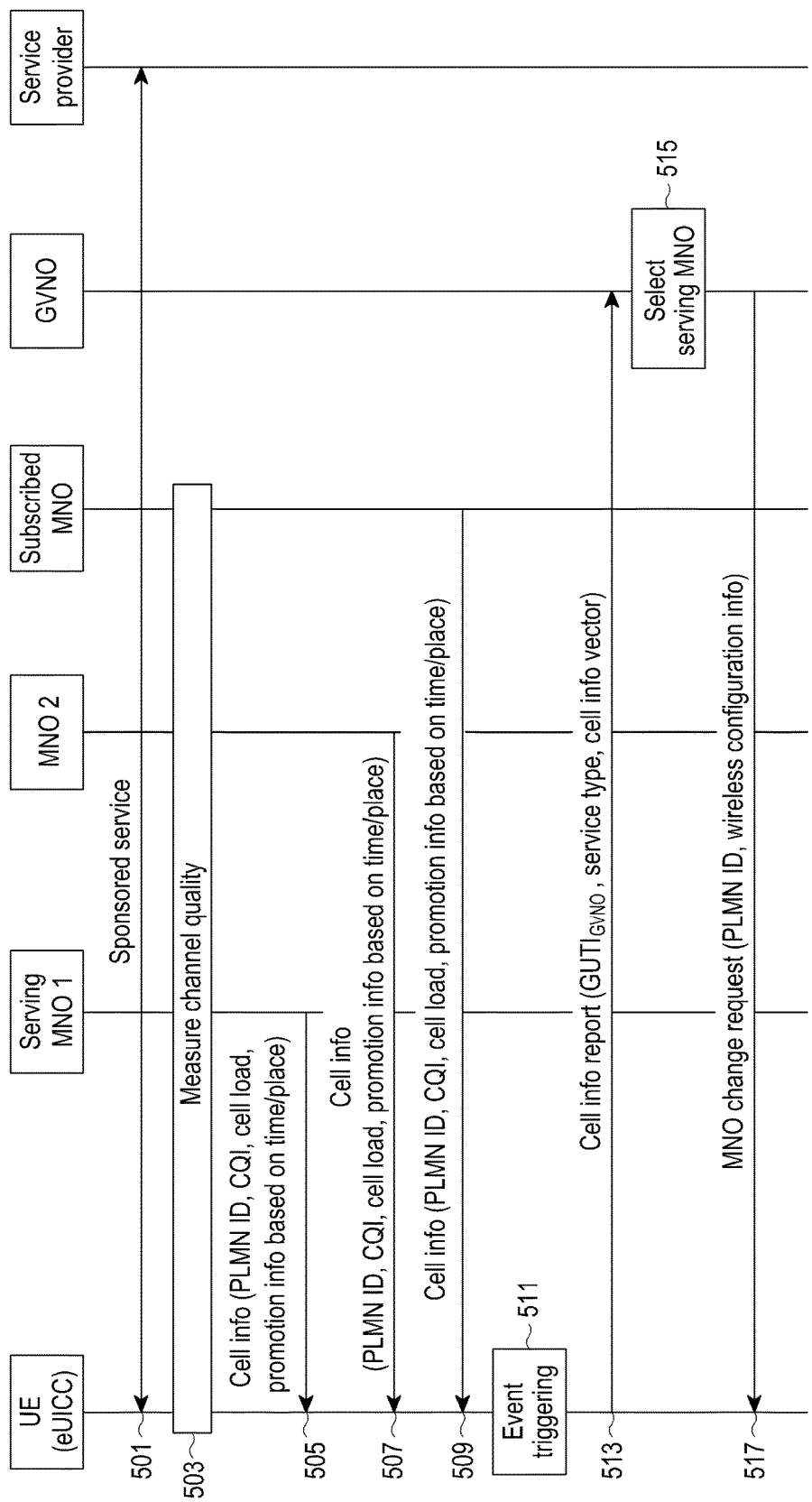
FIG. 5 is a flow diagram illustrating a process in which a user equipment periodically receives network information from each operator network and delivers the received network information to a virtual network operator according to an embodiment of the present disclosure.

FIG. 5 is a flow diagram illustrating a process in which a user equipment periodically receives network information from each operator network and delivers the received network information to a virtual network operator according to an embodiment of the present disclosure.

In step 501, a user equipment receives a sponsored service (e.g., YouTube video streaming) from an ASP. Then, in step 503, the user equipment together with a subscribed MNO measures the quality of a channel therebetween. Through a channel quality measurement process, the user equipment is handed over between MNOs in order to receive a service of optimal quality.

As in steps 505, 507, and 509, not only a network, which currently provides a sponsored data connectivity service, but also candidate networks periodically transmit cell information messages to the user equipment. Here, the cell information message includes a PLMN ID, a Channel Quality Indicator (CQI), load information of a cell, price promotion information based on time and/or place, and the like. The PLMN ID is used to distinguish between network operators, and the load information of a cell represents the number of user equipments accessing a base station, radio resource capacity, and the like. The CQI represents a channel state of a relevant network. The price promotion information represents information, including price discount and the like, according to the amount of resources available for each base station. A price promotion may be established by an operator on the basis of, for example, area/time, which allows the operator to apply a more elastic price policy.

In step 511, the user equipment performs, for example, a new price promotion or triggers an event when a Signal-to-Interference-plus-Noise Ratio (SINR) is smaller than a threshold.

In step 513, the user equipment reports the cell information, which has been received from each MNO, to a GVNO periodically or according to a preset condition, in the form of a cell information report message. The cell information is used to transmit a GUTI value of the user equipment and the cell information received from each MNO in the form of a vector. Also, the cell information report message may include a $GUTI_{GVNO}$, a service type, a cell information vector, and the like.

In step 515, the GVNO, which has received the cell information or cell information report message, selects a serving MNO in view of the QoS, the type, price information, and the like of a service currently used by a user. In step 517, the GVNO transmits an MNO change request message to the user equipment. The GVNO transmits the MNO change request message, which indicates the selection of the serving MNO, to the user equipment, and thereby causes the user equipment to change an MNO. The MNO change request message includes a PLMN identifier, wireless configuration information, and the like.

In the present disclosure, the user equipment may simultaneously enable two or more profiles, and thus may simultaneously attach to two or more MNOs. The user equipment may attach, by default, to a subscriber network and may provide the existing always-connected services, that is, the transmission/reception of a telephone call and various Instant Messaging (IM) services. Also, for a sponsored data connectivity service, the user equipment may simultaneously attach to different MNOs and may receive a sponsored data connectivity service.

Figure 6:
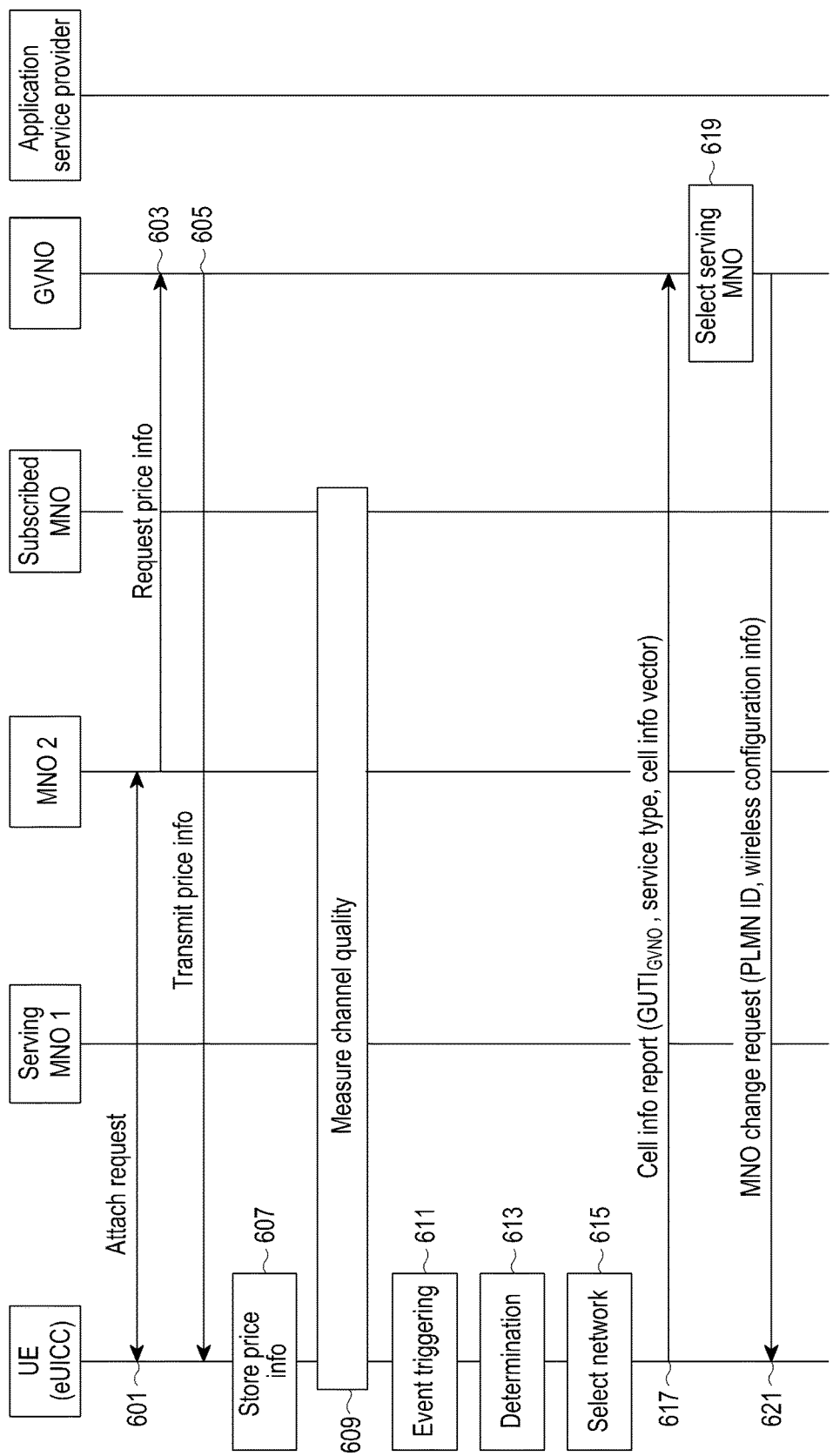
FIG. 6 is a flow diagram illustrating a process in which a user equipment periodically receives network information from each operator network and delivers the received network information to a virtual network operator according to another embodiment of the present disclosure.

FIG. 6 is a flow diagram illustrating a method for providing a data service in a wireless communication system according to another embodiment of the present disclosure.

A user equipment acquires price information from an MNO in FIG. 5, but acquires price information from a GVNO in FIG. 6.

First, in step 601, the user equipment transmits an attach request message to, for example, an MNO 2. Then, in step 603, the MNO 2 sends a request for price information to a GVNO on the basis of information included in the attach request message. In step 605, the GVNO transmits the price information, which is requested by the user equipment, to the user equipment. Thereafter, in step 607, the user equipment stores the acquired price information in a storage medium.

In step 609, the user equipment together with a subscribed MNO measures the quality of a channel therebetween. In step 611, the user equipment performs a new price promotion, for example, in which a result of the channel measurement is reflected, or triggers an event when an SINR is smaller than a threshold.

In step 613, the user equipment determines that a network to be used is a wireless network providing a GSP service, on the basis of at least one of a service type, QoS, and price information. And, in step 615, the user equipment selects the relevant network.

Then, in step 617, the user equipment transmits a cell information report message to the GVNO. Here, the cell information report message includes a $GUTI_{GVNO}$, a service type, a cell information vector, and the like. Then, in step 619, the GVNO selects a serving MNO. At this time, the GVNO selects the serving MNO in view of QoS, a service type, price information, and the like of the service currently used by a user.

Figure 7:
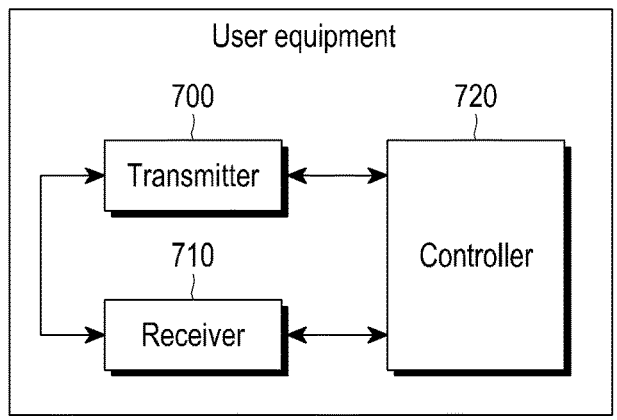
FIG. 7 is a view illustrating a configuration of a user equipment in a communication system according to an embodiment of the present disclosure.

Then, in step 621, the GVNO transmits an MNO change request message to the user equipment. The GVNO transmits the MNO change request message, which indicates the selection of the serving MNO, to the user equipment, and thereby causes the user equipment to change an MNO. The MNO change request message includes a PLMN identifier, wireless configuration information, and the like. FIG. 7 is a view illustrating a configuration of a user equipment in a communication system according to an embodiment of the present disclosure.

Referring to FIG. 7, a user equipment includes a transmitter 700, a receiver 710, and a controller 720.

The transmitter 700 and the receiver 710 respectively include a transmission module and a reception module for transmitting and receiving data to/from an MNO in the communication system according to an embodiment of the present disclosure. The controller 720 may perform a control operation for attaching to an MNO and communicating with a GVNO according to the procedures described with reference to FIGS. 1 to 6.

The controller 720 receives wireless network information from the GVNO, and performs a semi-attach to a wireless network included in the wireless network information. At this time, the GVNO determines that the wireless network is a wireless network providing a GSP service, on the basis of at least one of a service type, QoS, and costs which are required by a user.

Figure 8:
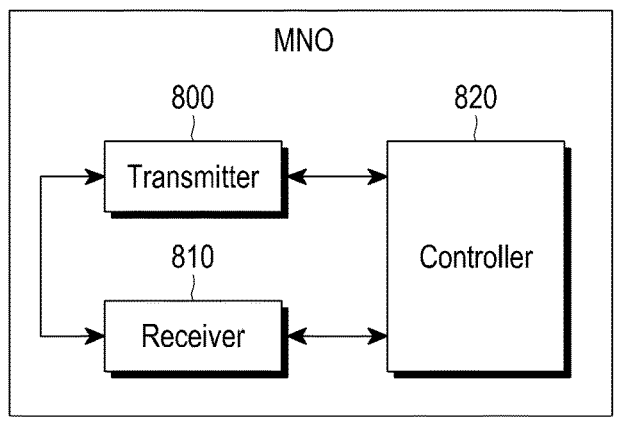
FIG. 8 is a block diagram illustrating a configuration of a Mobile Network Operator (MNO) in a communication system according to an embodiment of the present disclosure.

FIG. 8 is a block diagram illustrating a configuration of an MNO in a communication system according to an embodiment of the present disclosure.

Referring to FIG. 8, the MNO includes a transmitter 800, a receiver 810, and a controller 820.

The transmitter 800 and the receiver 810 respectively include a transmission module and a reception module for transmitting and receiving data to/from a user equipment or GVNO in the communication system according to an embodiment of the present disclosure.

The controller 820 may perform a control operation for attaching to the user equipment or GVNO and communicating with the same according to the procedures described with reference to FIGS. 1 to 6.

Figure 9:
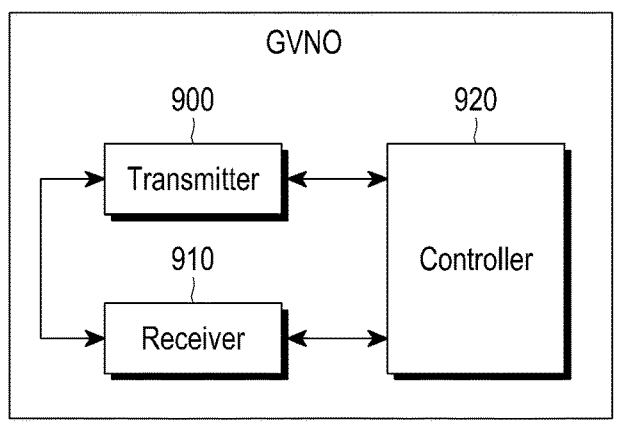
FIG. 9 is a block diagram illustrating a configuration of a global virtual network operator in a communication system according to an embodiment of the present disclosure.

FIG. 9 is a block diagram illustrating a configuration of a GVNO in a communication system according to an embodiment of the present disclosure.

Referring to FIG. 9, the GVNO includes a transmitter 900, a receiver 910, and a controller 920.

The transmitter 900 and the receiver 910 respectively include a transmission module and a reception module for transmitting and receiving data to/from a user equipment or MNO in the communication system according to an embodiment of the present disclosure.

The controller 920 may perform a control operation for attaching to the user equipment or an MNO and communicating with the same according to the procedures described with reference to FIGS. 1 to 6.

The controller 920 determines that a network to be used is a wireless network providing a GSP service, on the basis of at least one of a service type, QoS, and costs which are required by a user, and notifies the user equipment of the determined wireless network.

Meanwhile, it will be appreciated that the method and the device for providing a data service in a wireless communication system according to an embodiment of the present disclosure may be implemented in the form of hardware, software, or a combination thereof. Any such software may be stored, for example, in a volatile or non-volatile storage device such as a ROM, a memory such as a RAM, a memory chip, a memory device or a memory integrated circuit, or a storage medium, such as a Compact Disc (CD), a Digital Versatile Disc (DVD), a magnetic disk or a magnetic tape, which is optically or magnetically recordable and simultaneously, is readable by a machine (e.g., a computer), regardless of whether the software can be deleted or rewritten. It will be appreciated that the method for providing a data service in a wireless communication system according to an embodiment of the present disclosure may be implemented by a computer or a portable terminal including a controller and a memory, and that the memory is an example of a machine-readable storage medium suitable for storing a program or programs including instructions for implementing the embodiments of the present disclosure.

Accordingly, embodiments of the present disclosure include a program including codes for implementing a device or a method which is set forth in any claim of the present specification, and a storage medium that stores the program and is readable by a machine (a computer, etc.). Also, the program may be electronically conveyed by any medium such as a communication signal transmitted through a wired or wireless connection, and the present disclosure suitably includes equivalents of the program.

Further, the device for providing a data service in a wireless communication system according to an embodiment of the present disclosure may receive and store the program from a program providing apparatus that is wiredly or wirelessly connected to the device. The program providing apparatus may include: a memory that stores a program including instructions which cause a program processing apparatus to perform a preset data service providing method in a wireless communication system, information required for the data service providing method in the wireless communication system, and the like; a communication unit that performs wired or wireless communication with the program processing apparatus; and a controller that transmits the relevant program to the transmission/reception apparatus, at a request from the program processing apparatus or automatically.

Meanwhile, while the present disclosure has been shown and described with reference to certain embodiments thereof, it goes without saying that various changes in form and details may be made therein without departing from the scope of the present disclosure. Therefore, the scope of the present disclosure should not be limited to the described embodiments but should be defined by the appended claims and equivalents thereof.

The invention claimed is:

1. A method for providing a data service by a global virtual network operator (GVNO) device of a wireless communication system, the method comprising:
receiving, from a user equipment (UE), service information including information about at least one of a service type, a service quality, or a service price;
determining a first wireless network to provide a data service to the UE and a second wireless network for a semi-attach of the UE based on the service information; and
transmitting, to the UE, information about the first wireless network and the second wireless network,
wherein the semi-attach is an attach to the second wireless network performed without a bearer establishment between the UE and the second wireless network, and
wherein the second wireless network is a handover candidate network for a handover of the UE based on channel state information for the UE in the first wireless network.

2. The method as claimed in claim 1,
wherein the first wireless network is a network to which the UE is subscribed, and
wherein the second wireless network is a network to which the UE is not subscribed.

3. The method as claimed in claim 1, wherein the semi-attach includes configuration of a key for mutual authentication and data communication between the UE and the second wireless network, and registration of a location of the UE in the second wireless network.

4. The method as claimed in claim 1, wherein indication information indicating the semi-attach is transmitted from the UE to the second wireless network.

5. The method as claimed in claim 1, wherein the channel state information includes a signal-to-interference-plus-noise ratio (SINR) information in the first wireless network.

6. A global virtual network operator (GVNO) device of a wireless communication system, the device comprising:
a transceiver configured to receive, from a user equipment (UE), user information including information about at least one of a service type, a service quality, or a service price; and
at least one processor configured to:
determine a first wireless network to provide a data service to the UE and a second wireless network for a semi-attach of the UE based on service information, and
control the transceiver to transmit, to the UE, information about the first wireless network and the second wireless network,
wherein the semi-attach is an attach to the second wireless network performed without a bearer establishment between the UE and the second wireless network, and
wherein the second wireless network is a handover candidate network for a handover of the UE based on channel state information for the UE in the first wireless network.

7. A method for receiving a data service by a user equipment (UE) of a wireless communication system, the method comprising:
transmitting, to a global virtual network operator (GVNO) device, service information including information about at least one of a service type, a service quality, or a service price;
receiving, from the GVNO device, information about a first wireless network and a second wireless network, the first wireless network and the second wireless network being determined based on the service information;
receiving the data service from the first wireless network by performing an attach to the first wireless network; and
performing a semi-attach to the second wireless network,
wherein the semi-attach is an attach to the second wireless network performed without a bearer establishment between the UE and the second wireless network, and
wherein the second wireless network is a handover candidate network for a handover of the UE based on channel state information for the UE in the first wireless network.

8. The method as claimed in claim 7,
wherein the first wireless network is a network to which the UE is subscribed, and
wherein the second wireless network is a network to which the UE is not subscribed.

9. The method as claimed in claim 7, wherein the semi-attach includes configuration of a key for mutual authentication and data communication between the UE and the second wireless network, and registration of a location of the UE in the second wireless network.

10. The method as claimed in claim 7, wherein the performing of the semi-attach comprises transmitting, to the second wireless network, indication information indicating the semi-attach.

11. The method as claimed in claim 7, wherein the channel state information includes a signal-to-interference-plus-noise ratio (SINK) information in the first wireless network.

12. A user equipment (UE) of a wireless communication system, the UE comprising:
a transceiver; and
at least one processor configured to control the transceiver to:

transmit, to a global virtual network operator (GVNO) device, service information including information about at least one of a service type, a service quality, or a service price, receive, from the GVNO device, information about a first wireless network and a second wireless network, the first wireless network and the second wireless network being determined based on the service information, receive the data service from the first wireless network by performing an attach to the first wireless network, and perform a semi-attach to the second wireless network wherein the semi-attach is an attach to the second wireless network performed without a bearer establishment between the UE and the second wireless network, and wherein the second wireless network is a handover candidate network for a handover of the UE based on channel state information for the UE in the first wireless network.

13. The GVNO device as claimed in claim 6,
wherein the first wireless network is a network to which the UE is subscribed, and
wherein the second wireless network is a network to which the UE is not subscribed.

14. The GVNO device as claimed in claim 6, wherein the semi-attach includes configuration of a key for mutual authentication and data communication between the UE and the second wireless network, and registration of a location of the UE in the second wireless network.

15. The GVNO device as claimed in claim 6, wherein indication information indicating the semi-attach is transmitted from the UE to the second wireless network.

16. The GVNO device as claimed in claim 6, wherein the channel state information includes a signal-to-interference-plus-noise ratio (SINR) information in the first wireless network.

17. The UE as claimed in claim 12,
wherein the first wireless network is a network to which the UE is subscribed, and
wherein the second wireless network is a network to which the UE is not subscribed.

18. The UE as claimed in claim 12, wherein the semi-attach includes configuration of a key for mutual authentication and data communication between the UE and the second wireless network, and registration of a location of the UE in the second wireless network.

19. The UE as claimed in claim 12, wherein the at least one processor is further configured to control the transceiver to transmit, to the second wireless network, indication information indicating the semi-attach.

20. The UE as claimed in claim 12, wherein the channel state information includes a signal-to-interference-plus-noise ratio (SINR) information in the first wireless network.

* * * * *